United States Patent [19]
Floyd et al.

[11] Patent Number: 5,326,808
[45] Date of Patent: Jul. 5, 1994

[54] ODOR FREE, AIR DRY, AQUEOUS EMULSION PAINTS

[75] Inventors: F. Louis Floyd, Strongsville; Gary P. Craun, Berea, both of Ohio

[73] Assignee: The Glidden Company, Cleveland, Ohio

[21] Appl. No.: 19,633

[22] Filed: Feb. 18, 1993

[51] Int. Cl.$^5$ ................................................ C08J 3/02
[52] U.S. Cl. .................................. 524/457; 524/507; 524/513
[58] Field of Search .................... 524/457, 507, 513

[56] References Cited

U.S. PATENT DOCUMENTS

| | | | |
|---|---|---|---|
| 4,198,330 | 4/1980 | Kaizerman et al. | 523/501 |
| 4,318,833 | 3/1982 | Guagliardo | 524/457 |
| 4,888,383 | 12/1989 | Huybrechts | 524/457 X |
| 4,927,876 | 5/1990 | Coogan et al. | 524/457 |

*Primary Examiner*—Judy M. Reddick
*Attorney, Agent, or Firm*—Thomas M. Schmitz

[57] ABSTRACT

An aqueous ambient dry paint coating based on vinyl acetate matrix polymer containing an oligomer selected from a polyurethane or a polyester having a Tg below −20° C. and a number average molecular weight between 200 and 20,000, where the coating is free of organic coalescing solvents. The matrix polymer is produced by mixing the oligomer with the vinyl acetate monomer and other ethylenic monomers, if any, to form an organic mixture of monomer and oligomer, providing an aqueous micro dispersion of the organic mixture phase droplet size less than 5 microns, and copolymerizing the monomer to produce a vinyl acetate polymer containing oligomer, where the polymeric system is free of coalescing organic solvent.

20 Claims, No Drawings

ODOR FREE, AIR DRY, AQUEOUS EMULSION PAINTS

This invention pertains to air dry emulsion paints based on emulsion polymeric binders and more particularly to odor-free, consumer latex paints free of polluting offensive odoriferous coalescing solvents.

BACKGROUND OF THE INVENTION

Paint coatings are surface protective coatings applied to substrates, dried to form continuous films for decorative purposes as well as to protect the substrate. Consumer paint coatings are air-drying aqueous coatings applied primarily to architectural interior or exterior surfaces, where the coatings are sufficiently fluid to flow out, form a continuous paint film, and dry at ambient temperatures to protect the substrate surface. A paint coating ordinarily comprises an organic polymeric binder, pigments, and various paint additives. In dried paint films, the polymeric binder functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in a dispersant medium, and thinning to commercial standards.

Latex paints for the consumer market ordinarily are based on polymeric binders prepared by emulsion polymerization of ethylenic monomers. A typical consumer latex paint binder contains a vinyl acetate copolymer consisting of polymerized vinyl acetate (80%) and butyl acrylate (20%). The hardness of the latex polymer must be balanced to permit drying and film formation at low application temperatures, which requires soft polymer units, while at the same time the polymer must be hard enough in the final film to provide resistance properties which requires hard polymer units. This is conventionally accomplished by designing a latex polymer with a moderately elevated Tg (glass transition temperature) but then lowering the Tg temporarily with a volatile coalescing solvent. Coalescing solvents function to externally and temporarily plasticize the latex polymer for time sufficient to develop film formation, but then diffuse out of the coalesced film after film formation, which permits film formation and subsequent development of the desired film hardness by the volatilization of the coalescent. Internal plasticization is based on coreaction of soft monomers with hard monomers to form a polymeric copolymer binder, such as 80/20 vinyl acetate/butyl acrylate, to obtain the desired film forming characteristics. If a lower Tg copolymer is used without a coalescing solvent, higher levels of soft comonomer are required leading to lower Tg polymer, and, hence, the final dried film would be undesirably soft, excessively tacky, readily stain, and readily pick up dirt.

A significant source of residual odor in latex consumer paints is directly due to the coalescing solvent. Coalescing solvents are typically linear (or slightly branched) glycol ethers and esters of 7 to 12 carbon atoms in length, which have boiling points typically above 200° C., and solubility parameters appropriate for the latex of interest. One typical coalescing solvent ordinarily contained in commercial latex paints is 2,2,4-trimethylpentanediol monoisobutyrare (Texanol® Eastman Chemical Co.). The odor associated with the gradual volatilization of this solvent is considered objectionable by consumers. Quite often the odor lingers for days or weeks after the paint is applied and dried. All useful coalescing solvents are volatile and have similar objectionable characteristics. An additional deficiency in conventional exterior latex paints is the decline in crack resistance of the dried paint film approximately proportional to the evaporation of the coalescing solvent. While better coalescing solvents have a retention time of about one year in dried paint films, cracking starts to progressively appear after one year in dried paint films. Hence, the elimination of coalescing solvents and attendant objectionable odors, along with air pollution caused by volatile organic compounds (VOC), and film cracking deficiencies represent both a technical and marketing advance in the state of the art of consumer latex paints.

In polymer technologies unrelated to air-dry vinyl acetate latex paints, preformed polymers have been dispersed into monomers and emulsified in water, whereupon the monomers are then polymerized, such as disclosed in U.S. Pat. No. 4,373,054 pertaining to cathodic electrocoating, or in U.S. Pat. No. 4,313,073 pertaining to alkyd prepolymers; U.S. Pat. No. 4,588,757 pertaining to laminating adhesives, or in U.S. Pat. Nos. 3,953,386 and 4,011,388 pertaining to aqueous emulsion blends containing cellulosic ester/acrylic polymers.

It now has been found that certain non-volatile softening oligomeric modifiers compatible with a polyvinyl acetate matrix polymeric binder in a consumer latex paint can be retained in the dried paint film permanently. Softening oligomers of this invention can be incorporated into the paint where the oligomer will be retained permanently in the final paint film. Hence, the paint will not generate an odor while drying nor emit a residual odor from the dried paint film or otherwise emit VOC's. The softening oligomeric modifiers of this invention externally modify the polyvinyl acetate and are not coreacted with the polyvinyl acetate polymeric binder. The softening oligomeric modifiers appear to function by a chain-spacing mechanism to soften the polyvinyl acetate polymers whereby the oligomeric modifiers provide low temperature film formation and tack-free films less prone to soiling at a given hardness and/or flexibility than ordinarily possible. A further advantage of this invention enable the use of essentially all hard polymer units of polyvinyl acetate without the need for internal plasticization (coreaction) with soft butyl acrylate polymeric units.

The present invention is based on a softening oligomeric modifiers having a low and narrow molecular weight range where the oligomer will not subsequently diffuse out of the matrix polyvinyl acetate polymer when properly dispersed into the polymeric binder phase. Preferred oligomers are non-volatile oligomers having a molecular weight between about 300 and 10,000. Lower molecular weight compounds tend to be volatile and cause excessive plasticizer migration while higher molecular weight polymers lose low temperature film-forming and softening effects, although molecular weights above 10,000 and in some instances up to 20,000 can be used with softer matrix polymers. According to the process of this invention, a compatible organic solution of oligomeric modifier in ethylenic monomer is subjected to high energy shear to prepare a sub-micron size organic phase dispersed into water. Subsequent polymerization of the micronized monomer droplets produces a softened modified latex very different from conventional emulsion or suspension polymerization polymers. The micro suspension polymerization is generally necessary with the oligomeric modifiers to accomplish the required sub-micron aqueous emulsification of the monomer containing the dissolved oligomeric modifier, since the oligomer will not readily diffuse during polymerization from particle to particle across the aqueous phase.

The principal advantage of this invention is the elimination of the odor and VOC associated with volatile coalescent solvents which are intentionally volatile and intended to migrate out of the dried paint film. An additional advantage pertains to dried paint films exhibiting superior toughness obtained through the use of a hard polyvinyl acetate matrix polymer balanced with the oligomeric modifier to accommodate softening through the external addition of softening modifier while retaining the desired dried film hardness. A further advantage pertains to lower net cost for both interior and exterior paints since high cost soft monomers can be avoided, volatile coalescing agents can be eliminated and binder volume can be increased by using a permanent non-volatile softening oligomer instead of a volatile coalescent. The resulting dried paint films exhibit a superior balance of hardness and flexibility while maintaining long term flexibility. These and other advantages of this invention will become more apparent by referring to the detailed description and illustrative examples.

SUMMARY OF THE INVENTION

Briefly, the air-dry, aqueous emulsion paint of this invention contains an oligomeric modified binder of polymerized ethylenic monomers preferably comprising a polyvinyl acetate polymeric binder externally modified with a non-reactive, low molecular weight, compatible oligomer selected from a polyester-urethane copolymer, a polyether-urethane copolymer, a polyurethane-urea copolymer, a polyester-amide, or a polyester, where above 1% and desirably between 3% and 50% by weight of the binder comprises softening oligomer added to the polyvinyl acetate polymeric binder. In accordance with the process of this invention, the low molecular weight softening oligomer has a preferred number average molecular weight between 300 and 10,000 and is effectively dissolved in vinyl acetate monomer to form a compatible organic mixture before forming the polyvinyl acetate matrix polymer. The organic mixture is dispersed into water by high shear, whereupon the vinyl acetate is polymerized to produce a stabilized latex containing the low molecular weight oligomeric modifier.

DETAILED DESCRIPTION OF THE INVENTION

The air-dry emulsion paint of this invention comprises an emulsion polymer comprising a polyvinyl acetate polymeric binder containing a non-volatile oligomeric modifier. Suitable oligomeric modifiers in accordance with this invention comprise low molecular weight oligomers including urethanes consisting of polyester-urethane copolymers, polyether-urethane copolymers, polyurethane-urea copolymers; polyester polymer comprising polyester-amides and polyester polymers. The foregoing softening oligomeric modifiers function as effective external modifiers for latex emulsion paints, and particularly for polyvinylacetate binder latex paints.

Useful non-volatile oligomeric modifiers have a number average molecular weight range between about 200 and 20,000, preferably between 300 and 10,000 and most preferably between 500 and 5,000. A preferred characterization of the oligomer modifier is in units of degree of polymerization (DP Units) which refers to the repeating monomer units without regard to molecular weight although the molecular weight is maintained relatively low as indicated. DP units defines the approximate chain length of the oligomers without regard to side units. The oligomeric modifier of this invention should have a DP between about 2 and 100, preferably between 2 and 50 and most preferably between 2 and 20 DP units. Useful oligomer modifiers have low Tg's to sufficiently impart a plasticizing effect on the matrix polyvinyl acetate polymer. Useful Tg's of the oligomeric modifier measured by Differential Scanning Calorimetry (DSC) at 10° C/minute scan rate are less than −20° C., preferably less than −40° C. and most preferably below −50° C. The level of oligomer modifier needed can vary considerably in the final latex. The level required depends on the inherent softening efficiency of the oligomer (estimated by its Tg) and the Tg of the matrix (parent) polymer. The Fox equation is useful for estimating the level needed:

$$1/T_g \, (mix) = (W_p/T_{g,\,p}) + (W_m/T_{g,\,m})$$

where
- $T_g \, (mix)$ = glass transition temperature of the modified polymer (which is a mixture);
- $W_p$, $W_m$ = weight fraction of the parent (matrix) polymer and oligomeric modifier, respectively;
- $T_{g,\,p}$; $T_{g,\,m}$ = glass transition temperature of the parent (matrix) polymer and the oligomeric modifier, respectively.

Thus, the level of oligomeric modifier required is directly related to the Tg of the parent polymer, and inversely related to the Tg of the oligomer. Hence, the lower oligomer Tg will more efficiently soften the polyvinyl acetate matrix polymer provided the oligomer and matrix polymer are compatible. Compatibility of a polymeric mixture is commonly said to exist when the mixture remains substantially optically clear, which indicates the two components are mutually soluble. In this invention, compatibility is intended to mean that the oligomeric modifier is soluble in the matrix polymer in the solid state. Complete compatibility is believed to exist when these conditions are met: in the solid state the mixture has a Tg (DSC, DMA) intermediate between the Tg's of the two components; the absence of component Tg transitions; the mixture Tg is smoothly dependent on level of modifer; and the mixture Tg follows a mixing rule such as the Fox equation. Tg's of mixtures depend on the Tg's of the two components, concentrations of the two components, and compatibility of the two components. The present invention pertains to substantially compatible components.

In accordance with this invention, low molecular weight polyurethane oligomers such as polyester-urethanes, polyether-urethanes, polyether urethane-urea copolymers, and polyester polymers including polyester-amide copolymers can be utilized as external softening oligomers in the polyvinyl acetate binder matrix polymers. Useful polyurethane copolymers typically contain urethane groups in the polymer backbone and are produced by reacting excess equivalents of diol or polyol with lesser equivalents of di- or polyisocyanate. The polyisocyanates can be di- or triisocyanates such as for example 2,4- and 2,6- toluene diisocyanate, phenylene diisocyanate; hexamethylene or tetramethylene diisocyanate, 1,5-naphthalene diisocyanate, ethylene or propylene diisocyanate, trimethylene or triphenyl or triphenylsulfone triisocyanate, and similar di- or triisocyanates. The polyisocyanate can be generally selected from the group of aliphatic, cyclo-aliphatic and aromatic polyisocyanates such as for example hexamethylene 1,6-diisocyanate, isophorone diisocyanate, diisocyanate, 1,4-dimethyl cyclohexane, diphenylmethane diisocyanate 2,4-toluene diisocyanate, 2,6-toluene diisocyanate and mixtures thereof, polymethylene polyphenyl polyisocyanate.

Polyester-urethanes can be produced from diols comprising hydroxyl functional polyester polymer prepared by conventional esterification polymerization techniques from the common dicarboxylic acids and dihydroxyl functional reactants. Suitable carboxylic acids include adipic acid, succinic acid and anhydride, azelaic acid, maleic acid and anhydride, and other aliphatic carboxylic acids. Aromatic dicarboxylic acids include isophthalic acid, phthalic acid and anhydride, terephthalic acid, trimelitic anhydride and the like. Lesser amounts of mono-functional acids can be included, such as benzoic acid, 2-ethylhexanoic acid, if desired. Suitable dihydroxy functional materials include ethylene and propylene glycol, dipropylene glycol, diethylene glycol, neopentyl glycol, trimethylol propane, and lesser amounts of mono-functional alcohols such as benzyl alcohol and hexanol, if desired. Polyester prepolymers are generally prepared with excess hydroxyl functionality at molecular weights ranging from about 100 to 10,000 preferably about 200 to 2,000. Polyester prepolymers can be used alone or in combination with polyethers as hydroxyl functional prepolymers. Suitable hydroxyl functional polyether prepolymers include polyethylene oxide, polypropylene oxide, polybutylene oxide, and tetramethylene oxide where the polyether prepolymers have a molecular weight between about 100 and 10,000.

The polyesters and/or polyether prepolymers are then reacted with diisocyanate to advance the prepolymers to a molecular weight of about 200 to 20,000 and preferably between 300 and 10,000 to form polyester or polyether urethane oligomers of this invention. Diisocyanates are used preferably at an equivalent ratio of about 1 isocyanate group to 1.1 to 10 hydroxyl groups. Ratios of about 1.5 to 3 hydroxyl groups per isocyanate group are preferred. Preferred diisocyanates include toluene diisocyanate, isophorone diisocyanate, 1,6-hexane diisocyanate, diphenylmethane diisocyanate, and the like. Catalysts such as dibutyltindilaurate, tin oxide and the like can be used to increase the isocyanate reaction rate with the hydroxyl polyester or polyether prepolymer at temperatures of about 30° to 120° C. and preferably at about 70° to 100° C.

The polyester or polyether urethane copolymers can be further extended with diamine or polyamine, if desired, to produce polyurethane-urea copolymer useful as a softening oligomer modifier in polyvinyl acetate binder matrix polymers in accordance with this invention. In this regard, primary diamine or polyamine can be added to an isocyanate terminated polyurethane intermediate containing unreacted pendant or terminal isocyanate groups obtained by reacting excess equivalents of isocyanate relative to hydroxyl equivalents in the polyester or polyether prepolymers. The primary diamines readily react with the isocyanate functional intermediate to chain extend the polyurethane to a polyurethane-urea of a higher molecular weight. Alternatively amine can be prereacted with the diisocyanate prior to reacting with polyol. Suitable primary amines for chain extension include hexamethylene diamine, 2-methyl-pentanediamine and similar aliphatic diamines. Polyester and polyether urethane copolymers or polyurethanes extended with diamine to form polyurethane-ureas exhibit excellent compatibility with vinyl acetate monomers as well as the resulting polyvinylacetate polymers. Polyurethane intermediate molecular weights before chain extension can be between 400 and 10,000 while after chain extension with the diamine the final molecular weight of the polyurethane-urea can be between about 800 and 20,000.

In accordance with this invention, the polyurethane copolymers can be synthesized, dissolved in ethylenically unsaturated monomer such as vinyl acetate monomer, subsequently suspended in water, followed by polymerization of the ethylenic monomers. Polyurethane oligomers can be dissolved in vinyl acetate monomers to form a fluid organic solution containing above 1% and desirably between about 3% and 50% and preferably between 10% and 25% by weight oligomer based on the weight of the organic monomer solution. This organic mixture of oligomer and monomer is then suspended in water with high shear mixing to form a coarse suspension using the common latex surfactants as stabilizers, such as the sulfosuccinates, the sulfates, various ethoxylated phenols, and the like. The coarse suspension is then micronized to very fine particle size emulsion droplets of average size of less than 5 microns, preferably less than 1 micron, and most preferably less than 0.7 micron. High mechanical shear and/or ultrasound can be used to form the microemulsion. Typical additional ingredients include buffers, acrylic acid, sodium salt of acrylamido methyl propane sulfonic acid (NaAMPS) ordinarily added at 0.1% to 5% by weight levels based on solids. Initiators such as persulfate, peroxide, and azo initiators can be added before or after suspension of the organic mixture in water. Redox catalysts can be added if desired. Polymerization can be accomplished by simply raising the suspension temperature to about 70° C. to 80° C. using persulfate initiators. Initial reflux of vinyl acetate will be at 67° C., but the temperature will rise with monomer polymerization conversion. Additional vinyl acetate can be added, preferably after the preformed suspended vinyl acetate emulsion and other monomer have polymerized.

A further desirable non-reactive oligomer useful as a softening oligomer modifier in this invention comprises a polyester polymer. In accordance with this invention, a low molecular weight ester or polyester can be dissolved in vinyl acetate monomer, suspended in water, and the aqueous suspension micronized prior to polymerization of the monomers. Useful polyester oligomers comprise esterification reaction products of diols with dicarboxylic acids or a functional equivalent with minor amounts of polyol or polyacid if desired, to produce a low acid number polyester polymer. Suitable esters and polyesters for blending have molecular weights between about 200 and 20,000 and include the linear and branched esters and polyesters formed from saturated dicarboxylic acids such as adipic acid, glutaric acid, succinic acid, and other such linear aliphatic acids, acid anhydrides, and lower alkyl esters thereof; phthalic acid, isophthalic acid, trimellitic anhydride, and other aromatic acids, acid anhydrides, and lower alkyl esters thereof; monoacids such as benzoic acid, 2-ethylhexanoic acid and other aromatic and aliphatic acids, which if desired, may be used in minor amounts to end cap and limit molecular weight. Minor amounts of unsaturated dicarboxylic acids such as fumaric or maleic acid can be included, if desired, to enhance grafting with polymerized vinyl acetate monomers, which promotes compatibility and permanence of the oligomer in the matrix polyvinyl acetate polymer.

Diol functional materials include diethylene glycol, neopentyl glycol, 2-methyl pentane diol, ethylene glycol, butylene glycol, propylene glycol, dipropylene glycol and the like; or mono-functional glycol ether groups, such as butylcellosolve, butyl carbitol, and the like; as well as hydroxy acids such as lactic acid, and lesser amounts of triols and polyols, such as trimethylol propane and ethane, and pentaerythritol. Acids can be used in carboxyl form, anhydride form, or an ester form, such as the methyl ester form, with the above diols to form linear and branched polyesters desirably having an Acid No. below about 20, and a molecular weight between 200 and 20,000, desirably between 300 and 10,000, and preferably between about 500 and 5,000. Polyesters of diethylene or dipropylene glycol with adipic acid are preferred. The low molecular weight esters and polyesters lower the Tg of the blend and can eliminate the need for expensive comonomers such as butyl acrylate. Thus, low molecular weight esters and polyesters can be effectively used to provide excellent, non-tacky, paint films without the inclusion of coalescing solvents.

Ester and polyester oligomeric modifiers described above can be easily dissolved in vinyl acetate to form a fluid organic solution above about 1% and desirably between 3% and 50% by weight and preferably 10% to 25% oligomer modifer based on the weight of the organic solution. The organic solution of oligomer and monomer can be suspended in a surfactant treated aqueous medium by high speed prop stirring to form a coarse suspension, followed by ultrasonification or very high shear to produce a micronized suspension and reduce the particle size of the organic phase to about 5 microns or less, preferably less than 1 micron. Suitable surfactants are used at about 0.1 to 5% by weight (based on solids) and include the nonionic surfactants such as various ethoxylated phenols, block copolymers of ethylene oxide and propylene oxide, anionic surfactants such as sulfosuccinates, sulfates, and sulfonates, and the like (sulfosuccinates such as hexyl, octyl, and hexadecyl sulfosuccinate are preferred). Part of the vinyl acetate monomer can be polymerized followed by further polymerization of the remaining monomer if desired. Common initiators are used, such as the persulfates, azos, hydroperoxides, and peroxides, at typical initiator levels and polymerization temperatures as previously described for emulsion polymerization.

Polyester amide oligomeric modifiers are formed by the reaction of diols and diamines with dicarboxylic acids or esters. In a preferred process, methyl esters of adipic, glutaric, isophthalic or other common dicarboxylic acids are transesterified with diols and diamines at about 150° C. to 250° C. in the presence of common esterification catalysts such as butylstanoic acid. Typically greater amounts of diols, such as diethylene and dipropylene glycol, neopentyl glycol and the like are used with lesser amounts of diamines, such as 1, 6-hexanediamine, 2-methyl pentanediamine, or the longer chain amines (e.g. Jeffamine-Texaco). Lesser amounts of monoacids, monoesters, alcohols and amines, or polyacid, polyols, or polyamines can be added, if desired.

In accordance with this invention, the oligomer plasticizers are solubilized in vinyl acetate monomer, then dispersed into water and micronized into a microemulsion. The vinyl acetate monomer is polymerized to produce a polymeric binder comprising emulsion polymerized vinyl acetate. Selected amounts of other ethylenic monomers can be copolymerized with the vinyl acetate monomer to produce a copolymer containing by weight less than 60% and preferably less than 30% and most preferably less than 20% other ethylenic monomer. Polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl esters include vinyl propionate, vinyl laurate, vinyl decanoate, vinyl butyrates, vinyl benzoates, vinyl isopropyl acetates and similar vinyl esters; vinyl aliphatic hydrocarbon monomers include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexane, cyclopentadiene, and dicyclopentadiene; and vinyl alkyl ethers include methyl vinyl ether, isopropyl vinyl ether, n-butyl vinyl ether, and isobutyl vinyl ether. Acrylic monomers include lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, amino acrylates, methacrylates as well as acrylic acids such as acrylic and methacrylic acid, ethacrylic acid, alpha-chloroacrylic acid, alpha-cycanoacrylic acid, crotonic acid, beta-acryloxy propionic acid, and beta-styryl acrylic acid. Particularly preferred comonomers include acrylates such as methyl, ethyl, propyl, butyl (linear and branched), 2-ethyl hexyl; methacrylates such as methyl, ethyl, propyl, butyl (linear and branched), 2-ethyl hexyl; vinyl esters such as acetate, proprionate, butyrate, pentanoate (neo 5), nonanoate (neo 9), 2-ethyl hexanoate, decanoate (neo 10); and other ethylenic monomers such as ethylene, vinyl chloride, vinylidene chloride and butadiene.

The emulsion polymerized vinyl acetate monomer produces a matrix polymeric binder of polymerized vinyl acetate monomer where the most preferred polymeric binders comprise homopolymers of vinyl acetate. On a weight basis, the polymeric binders comprise between 40% and 100% polymerized vinyl acetate with the balance being other ethylenic monomers. Preferred polymeric binders contain at least 70% by weight polymerized vinyl acetate and most preferred 80% to 100% vinyl acetate. The number average molecular weight of the polymeric vinyl acetate binders should be between about 30,000 and 10,000,000 and preferably between 50,000 and 1,000,000 as measured by GPC (gel permeation chromatography) according to ASTM D3016-78, D3536-76, and D3593-80. The Tg or softening point of the modified polymeric binder particles should be less than 20° C. as measured by differential scanning calorimetry, preferably less than 10° C., most preferably <5° C. The MFT (minimum film formation temperature) is an alternative measure of polymer film formation determined on the neat latex on a temperature gradient temperature bar, and is typically a few degrees higher than the Tg of the latex. MFT should be less than 20° C., preferably less than 15° C., most preferred less than 10° C. The LTFF (low temperature film formation) is a film forming test run on the fully formulated paint. LTFF typically is reported as the lowest temperature at which no cracking is observed, or alternatively, the amount of coalescent or oligomer needed to achieve 40° F. failure-free coatings. LTFF should be less than 50° F. (10° C.), preferably less than 40° F. (5° C.). The distinction with LTFF is that other paint ingredients may have either an elevating influence (fillers, pigments) or depressing (surfactants, incidental solvents in additives) effect on LTFF relative to the MFT, which is measured on the latex alone. In turn, the MFT is measured from the wet state, and therefore includes the plasticizing effect of water, while the Tg is measured on an anhydrous sample of latex film, which does not include the water elasticizing effect. Latex paints are formulated to achieve LTFF of less than 50° F. (10° C.), preferably less than 40° C. (5° C.). It is also necessary for the final dried films to not be tacky at normal use temperatures (60°–110° F.). The polymeric binder contains between about 5% and 45% by weight softening oligomer with the balance being vinyl acetate polymer or copolymer matrix polymer.

Historically, prior art paints achieved a balance of properties by making the latex slightly too hard for LTFF to achieve the tack-free character, and then temporarily softening the binder polymer with a coalescing solvent to achieve the desired LTFF. This solvent then evaporates from the film over a period of days, which allows the restoration of tack-free character. If a binder copolymer containing an internal plasticizer is formulated to pass the LTFF test directly, the paint will be so tacky as to be unacceptable as a paint. However, by using non-volatile, external softening oligomers in accordance with this invention, the historical relationship between Tg (or MFT) and LTFF in the final paint has changed such that both film formation and tack free character are simultaneously obtained without the need for a volatile coalescing solvent. The softening oligomer is permanent by design and will not volatilize out of the paint film.

In accordance with the process of this invention, the preformed softening oligomer modifier is dissolved in the vinyl acetate monomer prior to polymerization to produce a compatible organic mixture of oligomer and monomer. The organic mixture may further contain a free radical initiator and is then suspended in water containing surfactant using high shear or ultrasound to produce an emulsified mixture of less than 5 microns and preferably less than 1 micron emulsion phase droplet comprising an organic phase dispersed into water. Thereafter the vinyl acetate monomer and other ethylenic monomer, if any, is polymerized in an aqueous polymerization medium by adding other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate. Redox systems consist of oxidants and reductants, which can be mixed in any pair. Transition metals such as iron can be used as accelerators for initiators for redox couples. The polymerization initiators are usually added in amounts between about 0.1 to 2 weight percent based on the monomer additions.

Suitable anionic surfactants include for example, salts of fatty acids such as sodium and potassium salts of stearic, palmetic, oleic, lauric, and tall oil acids, salts of sulfated fatty alcohols, salts of phosphoric acid esters of polyethylated long chain alcohols and phenols. Preferred anionic surfactants include for example, alkylbenzene sulfonate salts such as sodium dodecylbenzene sulfonate and salts of hexyl, octyl, and higher alkyl diesters of 2-sulfosuccinic acid. Suitable non-ionic surfactants include polyoxyethylene glycols reacted with a lyophilic compound, ethylene oxide condensation products reacted with t-octylphenol or nonylphenol and known as "Triton" surfactants, polymerized oxyethylene (IgepalCA), ethylene oxide reacted with organic acids (Emulfor), or organic acid reacted with polyoxamylene ether of stearic or oleic acid esters (Tweens).

The preferred process involves pre-suspension by mechanical shear followed by rotor-stator shear or ultrasonification to less than about 1 micron. Suitable surfactants include the various sulfosuccinates such as hexyl, octyl, and hexadecyl sulfosuccinate, the various alkyl and alkyl-aromatic sulfates and sulfonates, as well as the various nonionic ethylene oxide surfactants. The aqueous suspension can be generally formed at about 10% to 60% by weight total solids. The suspension can be heated to polymerize the vinyl acetate monomer while initiator is added if not already present in the pre-emulsion mixture. Suitable initiators include the common persulfates, peroxides, and hydroperoxides, along with redox initiator systems if desired. Additional vinyl acetate monomer can be added at any time during the polymerization to increase the particle size and raise the total solids of the system and help control the polymerization exotherm. The resulting polyvinyl acetate suspensions containing softening oligomer can be used directly in place of the common vinyl acetate copolymer latices in interior consumer air-dry paints.

A paint coating composition can be produced by combining the externally modified emulsion polymer of this invention with pigments and other paint additives in a dispersing mill such as a Cowles disperser. A pigment dispersion can be preformed consisting of a dispersant and pigments on a disperser mill, a sand mill, a pebble mill, a roller mill, a ball mill or similar conventional grinding mill for milling the mineral pigments into the dispersion medium. The premix can then be combined under low shear with the polymeric binder of this invention and other paint additives as desired. Useful mineral pigments ordinarily include opacifying pigments such as titanium dioxide, zinc oxide, titanium calcium, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower, barium sulfate, calcium carbonate and the like can be added.

The merits of this invention are further supported by the following illustrative examples.

EXAMPLES

Polyesters with a range of molecular weights and structures can function as effective plasticizing and coalescing agents for poly(vinylacetate). Polymer alloys (polymer blends) of the polyesters with polyvinyl acetate polymers form good clear films at room temperature and can be formulated into good air dry paints. Comonomer is not needed with vinyl acetate polymer and coalescing aid is not required for good film formation. This unique approach to avoiding the use of coalescing solvents is possible because the higher molecular weight polyesters are dissolved in polyvinyl acetate monomer and then dispersed into water by high shear and/or ultrasound prior to polymerization of the polyvinyl acetate as illustrated in the following examples.

EXAMPLE 1

An adipate polyester oligomer was prepared as follows:

|   | Grams |
|---|---|
| Adipic acid | 438.6 |
| Diethylene glycol | 382 |
| Butylstanoic acid | 0.5 |

The above raw materials were heated in a 2 liter flask under a nitrogen blanket with mechanical stirring to 170° C. while using the head temperature above a column packed with glass beads to regulate the esterification reaction. With a head temperature of 98° C., the reaction temperature increased slowly to 220° C., where the temperature was held for 2 hours and then cooled.

An aqueous suspension of vinyl acetate monomer and the above adipate polyester was prepared from the following materials.

|   | Grams |
|---|---|
| a) deionized water | 2000 |
| MM-80, Mona Chemical[1] | 11.2 |
| (NH$_4$) HCO$_3$ | 2.5 |
| NaAMPS, Lubrizol Corp. | 2.5 |
| vinyl acetate monomer | 625 |
| b) polyester from above | 312 |
| MT-70, Mona Chemical[2] | 5.6 |
| c) (NH$_4$)$_2$ S$_2$O$_8$ | 5.0 |
| d) vinyl acetate monomer | 625 |
| MT-70[3] | 5.6 |

[1]MM-80 = sodium dihexyl sulfosuccinate
[2]NaAMPS = sodium acrylamide methyl propane sulfonate
[3]MT-70 sodium ditridecyl sulfosuccinate Organic solution (a) was dispersed in aqueous solution (b) with a prop stirrer at about 5000 rpm for 20 seconds and passed through the flow through cell of a Sonics Corp. model VC-600 ultrasonic device at 85% power. The resulting aqueous emulsion was heated with stirring under a nitrogen blanket to 65° C. Component (c) was added and 65° C. was held for 1.5 hours. Monomer mixture (d) was added over 3 hours at 72° C., held 1 hour, and then cooled.

EXAMPLE 2

In a manner similar to Example 1, a phthalate polyester oligomer was prepared, mixed with vinyl acetate monomer, micronized into water by high shear, and polymerized. The phthalate polyester was as follows:

|   | Grams |
|---|---|
| phthalic anhydride | 593 |
| diethylene glycol | 318.3 |
| butyl cellosolve | 236.4 |

The raw materials were heated under nitrogen to 200° C., then slowly raised to 220° C. over 2 hours while keeping the head temperature of the packed distillation column at 98° C. Total distillate was 73 g. A suspension of the above phthalate polyester was prepared as follows:

|   | Grams |
|---|---|
| a) deionized water | 800 |
| MM-80 | 3.0 |
| NaHCO$_3$ | 2.0 |
| b) vinyl acetate monomer | 250 |
| polyester (Ex. 2 above) | 80 |
| c) K$_2$S$_2$O$_8$ | 2.0 |
| d) vinyl acetate monomer | 250 |
| MT-70 | 3.0 |

The procedure for polymerizing the ethylenic monomers was the same as described in Example 1.

EXAMPLE 3

In a manner similar to Example 2, a polymer was prepared from the raw material in Example 4 except that the amount of phthalate polyester was increased from 80 grams to 50 grams.

EXAMPLE 4

In a manner similar to Example 2, a polymer was prepared using the following components using a commercial polyester believed to be a polyether-phthalate-polyester capped with benzoic acid (Hercoflex 900, Hercules Corp.).

|   | Grams |
|---|---|
| a) deionized water | 2000 |
| MM-80 | 15 |
| NaHCO$_3$ | 2.5 |
| NaHCO$_3$ | 7.5 |
| NaAMPS | 2.5 |
| b) vinyl acetate monomer | 625 |
| Hercoflex 900, (Hercules Corp.) | 250 |
| c) K$_2$S$_2$O$_8$ | 5.0 |
| d) vinyl acetate monomer | 625 |
| MT-70 | 7.5 |

The procedure from Example 1 was used to produce a latex polymer.

EXAMPLE 5

In a manner similar to Example 1, a polyester triester was prepared from the following reactants:

| | Grams |
|---|---|
| Ektasolve DB, Eastman Chem. (diethylene glycol butyl ether) | 365 |
| trimelitic anhydride | 145 |
| butylstanoic acid | 0.1 |

The water of reaction distilled off was 29 grams.

A polymer was prepared according to the polymerization process described in Example 3 but from the following components:

| | | Grams |
|---|---|---|
| a) | deionized water | 800 |
| | MM-80 | 3.0 |
| | NaHCO$_3$ | 2.0 |
| b) | vinyl acetate monomer | 250 |
| | triester from Ex. 4 | 50 |
| | MT-70 | 1.0 |
| c) | K$_2$S$_2$O$_8$ | 2.0 |
| | vinyl acetate monomer | 250 |
| | MT-70 | 3.0 |

EXAMPLE 6

Clear unpigmented films were prepared from the polymers prepared in Examples 1-5. Physical properties of latex and air dried clear paint films were as follows:

| Suspension | Min. Film Temp. Crack Point | Min. Film Temp. Knife Point | Tack |
|---|---|---|---|
| Ex. 3 | <3 | <3 | None |
| Ex. 4 | 12 | 24 | None |
| Ex. 5 | 3 | 9 | None |
| Ex. 6 | <3 | 6 | None |
| Ex. 7 | 4 | 15 | None |
| Control* | 10 | 12 | None |

*Control was an unmodified commercial latex typically used in consumer air-dry paints and comprising 80/20 weight ratio of vinyl acetate polymerized with butyl acrylate.

EXAMPLE 7

White semi-gloss latex paints were prepared from any one of the foregoing emulsion polymers described in Examples 1-5 from the following ingredients:

| Group | Pigment Grind: Ingredient | Grams |
|---|---|---|
| A | Water | 151.68 |
| A | Thickener | .50 |
| A | Ammonia (28%) | .01 |
| B | Surfactant | 5.00 |
| C | Defoamer | 2.00 |
| C | Surfactant | 2.00 |
| D | TiO$_2$ pigment | 145.00 |
| D | Clay extender pigment | 50.00 |

Group A ingredients were added to Cowles dispersing equipment and mixed for 5 minutes. Group B and then C ingredients were added with continued mixing under slow agitation. Group D ingredients were added under high speed agitation and grind for 15 minutes or until a Hegman 5.5 was attained. The foregoing is the grind portion of the paint.

| Letdown | Ingredient | Grams |
|---|---|---|
| E | Water | 33.00 |
| F | Water | 33.00 |
| F | Thickener | 3.50 |
| F | Ammonia Hydroxide | .01 |
| G | Preservative | 1.00 |
| H | Defoamer | 5.00 |
| H | Propylene glycol | 40.00 |
| H | Surfactant | 4.50 |
| H | Rheology Modifier | 9.00 |
| H | Surfactant | 3.00 |
| I | Latex | 393.00 |
| I | Opacifier latex | 105.00 |

Group E ingredients were added in separate vessel, followed by Premix F added to E ingredients with slow speed agitation. Group G ingredients were added at slow speed. Premix H ingredients were then added to vessel. Premix I ingredients were mixed for 30 minutes and then added to vessel. The final composition was mixed for 1 hour. The foregoing is the letdown portion of the paint.

Latex Paint

The letdown above was added to the pigment grind above under slow speed agitation and allowed to mix for 2 hours.

EXAMPLE 8

Benzoic Acid Capped Polyester Oligomer Modifier

| Ingredient | Grams |
|---|---|
| adipic acid | 731 |
| diethylene glycol | 637 |
| butylstanoic acid | 0.5 |
| benzoic acid | 244 |

Heat the above components gradually with adequate stirring under a nitrogen atmosphere to 220° C. (Water will begin to distill at about 170° C., and about 3 hours will be required to move the batch from 170° C. to 220° C.). Using a packed column, maintain the head temperature at 99° C. throughout this portion of the synthesis. When the head temperature drops below 80° C., remove the column and replace with a Dean-Stark trap. Fill the trap with xylene, and then add just enough additional xylene to give a constant reflux. Allow xylene reflux to azeotrophe water out of the batch, and reduce acid number to about 10 mg KOH/g resin. Remove xylene under a vacuum (25 inches Hg). Cool.

EXAMPLE 9

Benzoic Acid Capped Polyester Urethane Oligomer Modifier

As in Example 8, but use only 122 g benzoic acid, then cool batch to 60° C. at the end of the synthesis, and add 111 g isophorone diisocyanate. Allow the exotherm to carry the temperature (with gentle heating) to 90° C., and hold for 2 hours. Cool.

EXAMPLE 10

Polyester Urethane Oligomeric External Modifier

| Ingredient | Grams |
|---|---|
| adipic acid | 731 |
| diethylene glycol | 636 |
| butylstanoic acid | 0.5 |

Synthesize a polyester from the above ingredients in the same manner as in Example 8, and then add 111 g isophorone diisocyanate to form a polyester urethane as in Example 9.

EXAMPLE 11

Polyester Urethane External Modifier

| Ingredient | Grams |
|---|---|
| adipic acid | 366 |
| dipropylene glycol | 403 |
| butylstanoic acid | 0.2 |

Form a polyester from the above ingredients as in Example 8, and then add 56 g isophorone diisocyanate to form a urethane as in Example 9.

EXAMPLE 12

Polyester Urethane Urea Oligomeric External Modifier

| Ingredient | Grams |
|---|---|
| adipic acid | 731 |
| dipropylene glycol | 805 |
| butylstanoic acid | 0.5 |

Synthesize a polyester from the above as in Example 8, and place 300 g of the product in a separate flask at 20° C. Add 29 g isophorone diisocyanate and 30 g Jeffamine ED-2001 polyethylene oxide diamine, 2000 mol. wt. no. ave. - Texaco. The Jeffamine is predissolved in 30 g vinyl acetate to enhance miscibility. Slowly warm to 40° C. to allow amine reaction with isocyanate, hold 1 hour, and then heat to 90° C. Hold 2 hours, and then cool.

EXAMPLE 13

Polyester Amide External Oligomer Modifier

| Ingredient | Grams |
|---|---|
| DBE-5 (dimethyl ester of glutaric acid, DuPont) | 481 |
| dipropylene glycol | 268 |
| Dytek A (2-methylpentane diamine) | 58 |
| butylstanoic acid | 0.2 |

Warm with good agitation under nitrogen to about 190° C. and distill off methanol with a good packed column. Keep column head temperature at 64° C., and gradually warm batch to 210° C. Cool after 160 g of methanol is removed.

EXAMPLE 14

Polyester Amide External Oligomer Modifier

| Ingredient | Grams |
|---|---|
| DBE-5 | 481 |
| dipropylene glycol | 268 |
| Jeffamine D-230 (polypropylene oxide diamine) | 115 |
| butylstanoic acid | 0.5 |

Synthesized by same procedure as in Example 13.

EXAMPLE 15

Polyester External Oligomer Modifier

| Ingredient | Grams |
|---|---|
| dipropylene glycol | 4717 |
| adipic acid | 4283 |
| triphenyl phosphine | 1.2 |
| butylstanoic acid | 3.0 |

Synthesize as in Example 8, but do not use xylene. When column head temperature drops to 80° C. acid number is about 20 mg KOH/g resin. Pull a vacuum of about 10 inches of Hg, and then gradually increase vacuum to pull off remaining water. Final acid number is 3 mg KOH/g resin.

EXAMPLE 16

Latexes were prepared with the following generalized formula and synthesized as described below.

| | | |
|---|---|---|
| a) | 2122 g | deionized water |
| | 8.5 g | MA-80 (dihexyl sulfosuccinate, Mona Chem.) |
| | 5.4 g | ammonium acetate |
| | 8.1 g | Na AMPS, 48% (Lubrizol Chemical) |
| | 10.5 g | A246L (Na olefin sulfonate, Rhone Poulenc) |
| b) | 7.4 g | Na formaldehyde sulfoxylate |
| | 10 ml | FeSO$_4$ aqueous solution, 1000 ppm |
| c) | 869 g | vinyl acetate |
| | 370 g | modifier as above from Examples 8 to 16 |
| | 3.1 g | acrylic acid |
| d) | 6.3 g | ammonium persulfate |
| | 14 g | A246L |
| | 159 g | deionized water |
| e) | 874 g | vinyl acetate |
| | 3.1 g | acrylic acid |
| f) | 2.0 g | ammonium persulfate |
| | 27 g | deionized water |

Weigh and mix thoroughly groups (a) and (c). Combine groups (a) and (c), stir with a spatula to disperse, and then emulsify for 5 minutes at 10,000 rpm in a Ross ME 100L emulsifier. Add (b) ingredients to the emulsion, and warm in a 5 liter Morton flask to 50° C. with good agitation under nitrogen. Pump in 40 ml of (d) over 2.5 hours, adjusting pumping rate to give a reaction temperature of about 55° C. Pump in the rest of (d) and all of (e) over 3 hours. Pump in (f) over 1 hour. Cool.

EXAMPLES 17-24

Latexes approximately equivalent were prepared as in Example 16 and mixed with modifiers identified in Examples 8-15 as indicated in Table 2.

TABLE 2

| Ex. | Modifier | DSC Tg | Knife Point MFFT | Dry Film Tack |
|---|---|---|---|---|
| 17 | Ex. 8 | 0 | 8.2 | None |

TABLE 2-continued

| Ex. | Modifier | DSC Tg | Knife Point MFFT | Dry Film Tack |
|---|---|---|---|---|
| 18 | Ex. 9 | 11 | 8.8 | None |
| 19 | Ex. 10 | 11 | 12.5 | None |
| 20 | Ex. 11 | 10 | 13.7 | None |
| 21 | Ex. 12 | 13 | 19.5 | None |
| 22 | Ex. 13 | 6 | 7.6 | None |
| 23 | Ex. 14 | −5 | 10.0 | Tacky |
| 24 | Ex. 15 | — | 16.5 | None |

*DSC Tg's in degrees C. (single, distinct transitions are noted). MFFT = minimum film formation temperature in degree C. (knife point). Tack and MFFT were measured for dry latex films (only DSC Tg was measured for modifiers).

The film from Example 23 is tacky at room temperature, while the other latexes form good, tack free films. The tack in Example 8 may be due to its very low Tg (−5° C.). Generally, Tg's in the 5°–10° C. range are preferred. MFFT's of 20° C. or less are preferred, indicating that good ambient and low temperature film formation will occur. Example 23 was marginally tacky due to low Tg of the film.

EXAMPLE 25

A polyester oligomer modifier was prepared from the following ingredients synthesized by the procedure in Example 8. Mn=910 and Mw=1770.

| Ingredient | Grams |
|---|---|
| adipic acid | 2303 |
| diethylene glycol | 2006 |
| butylstanoic acid | 2.0 |

EXAMPLE 26

A polyester modifier higher molecular weight was synthesized as in Example 1 to acid number 7, mg KOH/g resin. Mn=2570, Mw=5010.

| Ingredient | Grams |
|---|---|
| adipic acid | 330 |
| diethylene glycol | 450 |
| butylstanoic acid | 0.2 |

EXAMPLE 27

A polyester modifier of high molecular weight was synthesized as in Example 1, add 4 g additional diethylene glycol (to correct for glycol loss) and advance to higher molecular weight. Mn=8810, Mw=29,600

| Ingredient | Grams |
|---|---|
| diethylene glycol | 326.6 |
| adipic acid | 450 |
| butylstanoic acid | 0.2 |

EXAMPLES 28–32

Latex paints were made from the latex of Example 15 mixed with the modifiers in Examples 25–27.

| Example | Modifier |
|---|---|
| 28 | Ex. 25 |
| 29 | Ex. 26 |
| 30 | Ex. 27 |
| 31 | DER 333N (190 epoxy eqv. wt., Dow Chemical) |
| 32 | Poly THF 1000 |

-continued

| Example | Modifier |
|---|---|
| | (polytetramethylene oxide 1000 m. wt.) |

EXAMPLE 33

A latex was made from the following ingredients and synthesized as described below.

| | | |
|---|---|---|
| a-1) | 760 g | deionized water |
| | 3.0 g | MA-80 |
| | 3.7 g | A246L |
| | 1.9 g | ammonium acetate |
| | 3.1 g | Na AMPS |
| a-2) | 312 g | vinyl acetate |
| | 1.1 g | acrylic acid |
| | 116 g | modifier (as above) |
| b) | 2.6 g | Na formaldehyde sulfoxylate |
| c) | 3.7 ml | FeSO$_4$ aqueous solution, 1000 ppm |
| d) | 0.61 g | ammonium persulfate |
| | 1.3 g | A246L |
| | 31 g | deionized water |
| e) | 1.7 g | ammonium persulfate |
| | 5.6 g | A246L |
| | 42 g | deionized water |
| f) | 330 g | vinyl acetate |
| | 1.1 g | acrylic acid |
| g) | 0.71 g | ammonium acetate |
| | 9.6 g | deionized water |

Prepare mix a-1) and a-2), combine, and emulsify in an IKA works lab emulsifier, model SD-50, at the finest setting for 5 minutes. Place emulsion in a 2 liter Morton flask, and heat to 55° C. under nitrogen. Add (b) and (c), and then pump in (d) over 2.5 hours, controlling the exotherm at 55° C. Feed in mix (e) and (f) simultaneously over 2 hours, and then feed in (g) over 1 additional hour. Cool.

EXAMPLE 34

A vinyl acetate/butyl acrylate latex with polyester modifier was prepared as in Example 33 above, but instead mix (a-2) below and mix (f) below were used as follows:

| | | |
|---|---|---|
| a-2) | 280 g | vinyl acetate |
| | 1.1 g | acrylic acid |
| | 38.6 g | polyester modifier from Example 18 |
| | 70 g | butyl acrylate |
| f) | 296 g | vinyl acetate |
| | 74 g | butyl acrylate |
| | 1.1 g | acrylic acid |

EXAMPLE 35

A vinyl acetate/butyl acrylate latex with modifier was prepared as in Example 33 above but instead mix (a-2) and mix (f) below were used as follows:

| | | |
|---|---|---|
| a-2) | 265 g | vinyl acetate |
| | 1.1 g | acrylic acid |
| | 77.3 g | polyester modifier from Example 18 |
| | 66 g | butyl acrylate |
| f) | 280 g | vinyl acetate |
| | 70 g | butyl acrylate |
| | 1.1 g | acrylic acid |

The following is Table 3 listing properties for latex Examples 28–34.

TABLE 3

| Example | Knife Point MFFT | Ambient Film Tack |
|---|---|---|
| 28 | 16° C. | None |
| 29 | 19° C. | None |
| 30 | 28° C. | None |
| 31 | >29° C. | None |
| 32 | >29° C. | None |
| 33 | 17.4° C. | None |
| 34 | 16.3° C. | None |

The series of Examples 28, 29, and 30 illustrate the importance of modifier molecular weight. In moving from a polyester modifier with 2120 Mn (Example 28) to a polyester modifier with 8810 Mn (Example 30), MFFT moves from 16° C., which is normal for a latex with good low temperature film formation properties, to 28° C., which is too high for acceptable ambient and low temperature film formation. Increased amounts of the high molecular weight modifier will lower the MFT to an acceptable level. Examples 38 and 39 are unsatisfactory due to the composition and incompatibility of modifier.

EXAMPLE 36

A low molecular weight butyl carbitol diethylene glycol butyl ether/trimelitic anhydride triester modifier was prepared from the following ingredients and synthesized as described below.

| Ingredient | Grams |
|---|---|
| diethylene glycol butyl ether | 1095 |
| trimelitic anhydride | 435 |
| butylstanoic acid | 0.5 |

Stir under nitrogen in a 2 liter flask, and reflux off water with a good packed column, keeping head temperatures at 95° C. Cook at 190°–220° C., cool after 6.5 hours.

EXAMPLES 37–42

Several latexes were made according to the recipe below containing the triester modifier in Example 36 at triester levels indicated in each example 37–42 hereafter.

| Example Number | Triester Level |
|---|---|
| 37 | 0 |
| 38 | 25 g |
| 39 | 75 g |
| 40 | 100 g |
| 41 | 125 g |
| 42 | 150 g |

The above levels of triester were used in the following latex to form a latex paint containing the triester modifier.

| | | |
|---|---|---|
| a) | 800 g | deionized water |
| | 6.0 g | MM-80 |
| | 1.0 g | NaHCO |
| | 1.0 g | NaAMPS$^3$ |
| b) | 250 g | vinyl acetate |
| | 2.0 g | WAM (wet adhesion ureidal? monomer, Alcolac Chem.) |
| | (Z) g | triester level as above |
| c) | 2.0 g | ammonium persulfate |
| d) | 250 g | vinyl acetate |
| | 6.0 g | MT-70 (ditridecyl sulfosuccinate, Mona Chemical) |

Blend mix (b) into mix (a) with a lab turbine at about 1000 rpm. Pass through the flow through cell of an ultrasound unit at 85% (Sonics & Materials, VC-600). Heat to 67° C., hold 30 minutes, add (c) and hold 1.5 hours. Pump in (d) over 3 hours, and cool.

TABLE 4

To determine the effect of modifier level on degree of plasticizer, a variety of VA homopolymer latexes were synthesized, as described in examples 45–50 which contain concentrations of triester ranging from 0 to 30% of the latex solids as noted in Examples 45–50. Glass transition temperature were determined by DSC, as described in the specification, with results of two DSC runs as follows:

| Ex. | Pct. Triester | Tg DSC(1) | Tg DSC(2) |
|---|---|---|---|
| 45 | 0 | 38 | 36 |
| 46 | 5 | 13 | 30 |
| 47 | 15 | 6 | 13 |
| 48 | 20 | 0 | .6 |
| 49 | 25 | −4 | 2 |
| 50 | 30 | −12 | −5 |

Run 1 involves cooling to −100° C., and scanning to 150° C. Run 2 immediately follows run 1, and involves the same cooling and heating processes. It is commonly accepted in the field of thermal analysis that the more reliable and practically-significant result is the one for run 2.

This demonstrates the dependence of the Tg of the polymer-modifier mixture on the concentration of the plasticizing modifier. It also demonstrates the compatibility of the mixture, in that only single transitions are observed.

EXAMPLES 43 and 44

Vinyl acetate homopolymer (Ex. 43) and vinyl acetate/butyl acrylate copolymer (Ex. 44) were produced from the following ingredients.

| | Ex. 43 | Ex. 44 (control) | |
|---|---|---|---|
| a) | 2022 g | 2022 g | deionized water |
| | 7.2 g | 7.2 g | MM-80 |
| | 4.3 g | 4.3 g | ammonium acetate |
| | 5.4 g | — | SAM 181 surfactants (PPG Chemical) |
| | — | 5.4 g | A246L |
| b) | 35 g | 28 g | vinyl acetate |
| | — | 7.0 g | butyl acrylate |
| | 0.7 g | 0.7 g | ammonium persulfate |
| c) | 1700 g | 1034 g | vinyl acetate |
| | — | 677 g | butyl acrylate |
| | 2.4 g | 2.4 g | acrylic acid |
| d) | 5.4 g | 5.4 g | ammonium persulfate |
| | 21 g | 21 g | A246L |
| | 135 g | 135 g | deionized water |
| | 12 g | — | SAM 181 |
| | — | 15 g | NaAMPS |
| e) | 20 g | — | Triton X-100 (Rohm and Haas) |

Warm (a) to 71° C. under nitrogen with good stirring. Add (b) and allow exotherm to die (about 15 minutes). Pump in (c) and (d) in parallel over 5 hours. Hold 1 hour and add (e) dropwise over 5 minutes. Mix 20 minutes and cool.

Example 45

Comparison of Soft Copolymer, Coalesced Hard Copolymer (Prior Art) With Current Invention.

Prior art. Conventionally, the balance of low temperature film formation and absence of tack at ambient temperature is achieved by utilizing a latex composition with an elevated Tg, to achieve absence of tack, and then temporarily reducing its Tg with a volatile coalescing solvent such as Texanol, to achieve low temperature film formation. While this works well, it also involves the emission of the coalescing solvent into the atmosphere, which contributes odor and air pollution. Example 44 describes the synthesis of such a typical copolymer composition. For this experiment, that latex contained coalescing solvent at the level of 6% to achieve a KMFT of 10° C. A film cast with this coalesced latex is non-tacky at room temperature, but emits volatile solvent to the atmosphere.

Conversely, if one makes a copolymer with a low enough Tg to achieve low temperature film formation (60/40 VA/BA), it forms a film which is excessively tacky at ambient use temperature. While this would involve no emissions to the atmosphere, it involves a commercially unacceptable balance of properties. Example 28 describes the synthesis of a typical soft copolymer which achieves a KMFT of 10° C. on its own. A film cast from this latex is extremely tacky at room temperature, but emits no solvents to the atmosphere.

Present Invention. In the present invention, the use of a non-volatile external plasticizer accomplishes all three goals simultaneously: low temperature film formation, tack-free behavior at ambient temperatures, and no volatile organic emissions to the atmosphere. Example 43 describes the synthesis of a vinyl acetate homopolymer containing 18% modifier, which achieves a KMFT (knife MFT) of 10° C. on its own. A film cast from this latex is non-tacky at room temperature, and emits no solvents to the atmosphere. The results are summarized as follows:

| Approach | LTFF? | Ambient Tack (?) | Organic Emissions? |
|---|---|---|---|
| Coalesced hard latex | yes | no | yes |
| Soft copolymer | yes | yes | no |
| this invention | yes | no | no |

EXAMPLE 46

Demonstration of Non-Volatile and Non-Migrating Behavior of Modifier.

A VA/BA 80/20 copolymer latex (example 44) was compared to a vinyl acetate homopolymer latex coalesced conventionally with dibutyl phthalate (DBP), one coalesced conventionally with Texanol, and to an example of this invention (example 24) which was a VA homopolymer containing a polyester external modifier. The Tg of films of the four latexes was monitored by DSC for up to 8 weeks, while the films were aged at 140° F., to simulate accelerated aging of the films, and results are reported on Table 5.

TABLE 5

| Latex | Initial Tg | Tg (8 wks) | Change in Tg |
|---|---|---|---|
| hard copolymer | 17 | 17 | 0 |
| VA/DBP | 12 | 31 | 19 |
| VA/Texanol | 10 | 32 | 22 |

TABLE 5-continued

| Latex | Initial Tg | Tg (8 wks) | Change in Tg |
|---|---|---|---|
| Ex. 24 | 4 | 6 | 2 |

As expected, the untreated copolymer showed no change in Tg, since there were no volatiles to be lost in the system. Also as expected, the conventionally coalesced latexes showed a substantial increase in Tg, due to the loss of the volatile coalescing solvent. However, example 24 of this invention showed a negligible change, indicating that the modifier is essentially non-volatile.

An examination of the films showed that block resistance increased for the coalesced samples over time, while it remained constant for the untreated copolymer and for the example of this invention. This indicates that the modifier is also essentially non-migrating in nature.

EXAMPLE 47

Demonstration of Compatibility of Modifier in Matrix Polymer

The Tg's of the latex samples described in Table 4 were determined by both DSC and DMA. In both cases, the samples exhibited single Tg's, which were intermediate between the Tg's of the components. Additionally, there was no evidence of Tg transitions characteristic of either of the individual components. This is strong evidence of the compatibility the mixture of the modifier and the matrix polymer.

In addition, the Tg's of these same latex samples were compared to those calculated by the Fox relationship as described in the text. The component Tg's were −72° C. for the triester modifier, and 36° C. for VA homopolymer parent polymer, as determined by DSC. Results are reported in the following Table 6.

TABLE 6

| Pct Modifier | Meas. Tg | Calc. Tg | Difference |
|---|---|---|---|
| 0 | 36 | — | — |
| 5 | 30 | 28 | 2 |
| 15 | 13 | 13 | 0 |
| 20 | 6 | 6 | 0 |
| 25 | 2 | 0 | 2 |
| 30 | −5 | −7 | 2 |

This correlation between measured and calculated Tg's and the strong dependence of the Tg on the level of modifier, are strong evidence of the compatibility of the triester with the VA homopolymer.

We claim:

1. An aqueous air-dry paint coating composition containing an emulsion polymerized polymeric binder free of organic coalescing solvent, the polymeric binder comprising:
a vinyl acetate polymer comprising polymerized vinyl acetate monomer containing an oligomer having a number average molecular weight between about 200 and 20,000 and a Tg below about −20° C., the oligomer selected from a polyurethane and a polyester, the polymeric binder containing between about 3% and 50% by weight of said oligomer to provide a polymeric binder having a Tg less than 20° C., where said polymeric binder is produced by mixing the oligomer in the vinyl acetate monomer to provide an organic solution of oligomer and vinyl acetate monomer, where said organic solution is dispersed into and polymerized in water to produce an oligomer modified vinyl acetate emulsion polymer where the oligomer is soluble in the polymerized vinyl acetate monomer.

2. The paint coating of claim 1 where the oligomer has a number average molecular weight between about 300 and 10,000.

3. The paint coating of claim 1 where the oligomer has a number average molecular weight between about 500 and 5,000.

4. The paint coating of claim 1 where the oligomer has a Tg less than −40° C.

5. The paint coating of claim 1 where the oligomer has a Tg less than −50° C.

6. The paint coating of claim 1 where the organic solution is dispersed into water to form an aqueous dispersion, and the aqueous dispersion is micronized to a micronized aqueous dispersion having organic phase particle size droplets less than 5 microns prior to forming the oligomer modified vinyl acetate emulsion polymer.

7. The paint coating of claim 6 where the organic phase particle size droplets are less than 1 micron.

8. The paint coating of claim 6 where the organic phase particle size droplets are less than 0.7 microns.

9. The paint coating of claim 1 where the vinyl acetate monomer is a monomer mixture of vinyl acetate and other ethylenically unsaturated monomer, and the monomer mixture is emulsion copolymerized to produce an oligomer modified vinyl acetate emulsion copolymer.

10. The paint coating of claim 9 where the copolymerized monomer mixture comprises between 80% and 100% by weight copolymerized vinyl acetate monomer.

11. The paint coating of claim 9 where the copolymerized monomer mixture comprises at least 70% by weight copolymerized vinyl acetate.

12. The paint coating of claim 9 where the copolymerized monomer mixture comprises between 40% and 100% by weight copolymerized vinyl acetate.

13. The paint coating of claim 1 where the oligomer is a polyurethane.

14. The paint coating of claim 13 where the polyurethane oligomer is a polyester-urethane copolymer.

15. The paint coating of claim 13 where the polyurethane oligomer is a polyether-urethane copolymer.

16. The paint coating of claim 13 where the polyurethane oligomer is a polyurethane-urea copolymer.

17. The paint coating of claim 1 where the polymeric binder contains between 105 and 25% by weight of said oligomer.

18. The paint coating in claim 1 where the coating is free of volatile organic compounds.

19. The paint coating of claim 1 where the oligomer is a polyester polymer.

20. The paint coating of claim 19 where the polyester oligomer is a polyester-amide copolymer.

* * * * *